United States Patent [19]
Roberts et al.

[11] 3,891,596
[45] June 24, 1975

[54] THERMOPLASTIC INGREDIENT FOR MOLDING COMPOUNDS

[75] Inventors: Michael G. Roberts, Heath; Michael L. Matuszak, Newark, both of Ohio

[73] Assignee: Owens-Corning Fiberglas Corporation, Toledo, Ohio

[22] Filed: July 1, 1974

[21] Appl. No.: 484,641

Related U.S. Application Data

[62] Division of Ser. No. 361,663, May 18, 1973, Pat. No. 3,843,750.

[52] U.S. Cl. ............................... 260/40 R; 260/869
[51] Int. Cl. ............................................. C08g 51/04
[58] Field of Search.... 260/40 R, 862, 869, DIG. 24

[56] References Cited
UNITED STATES PATENTS

| | | | |
|---|---|---|---|
| 2,810,712 | 10/1957 | Baranauckas | 260/869 |
| 3,231,634 | 1/1966 | Wismer et al. | 260/862 |
| 3,470,116 | 9/1969 | Praetzel et al. | 260/869 |
| 3,701,748 | 10/1972 | Kroekel | 260/862 |

*Primary Examiner*—Donald E. Czaja
*Assistant Examiner*—S. M. Person
*Attorney, Agent, or Firm*—Carl G. Staelin; John W. Overman; Philip R. Cloutier

[57] ABSTRACT

A monomer made from a diester, one ester group of which is saturated and the other ester group of which contains ethylenic unsaturation which polymerizes into a thermoplastic. The center portion of the molecule which joins the two ester groups is halogenated, and the thermoplastic made from the material has particular advantages for use in low shrink polyesters. The thermoplastic, although halogenated, has good compatibility with the thermosetting prepolymer and when combined into a molding compound produces a molding compound having good pigmentability, fire resistance, stability, and low shrink properties.

10 Claims, No Drawings

THERMOPLASTIC INGREDIENT FOR MOLDING COMPOUNDS

This is a division of application Ser. No. 361,663, filed May 18, 1973, now U.S. Pat. No. 3,843,750.

BACKGROUND OF THE INVENTION

The present invention relates to a fire retardant thermoplastic and to low shrink polyester molding compounds containing the thermoplastic.

In recent years there has been a development wherein a mixture of a thermosetting polyester prepolymer and a thermoplastic polymer is dissolved in a mutual unsaturated solvent. During reaction of the unsaturated solvent with the polyester prepolymer, the thermoplastic is liberated into small bodies dispersed throughout the thermoset material to produce a composite whose shrink during cure is considerably less than would be expected were the thermoplastic not present. Since this development was made, men skilled in the art have tried a great number of different thermoplastic resins to improve the properties of the composite which is formed and to overcome numerous difficulties which are associated with the use of the thermoplastic material. One major problem has been that the mixture of the thermoplastic material, solvent, and thermosetting prepolymer tends to separate out into two layers upon standing. Another problem has been that the thermoplastic material has detracted from the desirable characteristics of the thermosetting portion, including a decrease in strength of the composite by reason of the thermoplastic diluent. Another problem created by the addition of the thermoplastic to the thermosetting prepolymer has been that the mixture has had less fire resistance than a corresponding polyester material that does not include a thermoplastic additive. In a few instances where halogenated thermoplastics have been added a serious compatibility problem with the thermosetting prepolymer has been experienced, and the combinations suggested by the prior art have not been workable. What is more, the fire retardant thermoplastics which have been suggested by the prior art have interferred with other desirable properties of the composite as for example, the receptivity of the mixture to dyes and pigments has been poor, the compatibility of the mixtures has been poor, and the effectiveness of the halogen utilized as a flame retardant has been poor.

An object of the present invention is the provision of a new and improved thermoplastic material which contains halogen but nevertheless has excellent compatibility with polyester prepolymers, and to molding compounds which contain the improved thermoplastic materials.

Another object of the present invention is the provision of new and improved materials of the above described type wherein the mixtures so produced have excellent dye receptivity.

A further object of the present invention is the provision of new and improved materials of the above described type having improved strength particularly when utilizing glass fibers as a reinforcement.

Further objects and advantages of the invention will become apparent to those skilled in the art to which the invention relates from the following description of several preferred embodiments.

DESCRIPTION OF THE PREFERRED EMBODIMENTS

According to the present invention there is provided thermoplastic materials for use in polyester molding compounds which thermoplastic materials although halogenated have excellent compatibility with thermosetting prepolymers and with unsaturated solvents for such polyester prepolymers. The molding compounds which incorporate the thermoplastic material have excellent pigment receptivity, excellent strength when cured, and produce a novel physical distribution of the thermoplastic material throughout the thermosetting material during cure of the molding compound.

Persons skilled in the art can determine the importance and scope of the present invention from the following examples and disclosure.

EXAMPLE 1

One embodiment of thermoplastic forming monomer that can be used in the present invention is prepared from the following materials:

| | |
|---|---|
| Tetrabromophthalic anhydride | 300 parts |
| Butyl alcohol | 98 parts |
| Hydroxyethyl acrylate | 49.2 parts |
| Paratoluene sulfonic acid | 0.3 parts |
| Paramethoxyphenol | 0.3 parts |

The monomer is prepared by heating the tetrabromophthalic anhydride with the butyl alcohol and paratoluene sulfonic acid in a flask for 1 hour at 125°C. Thereafter the flask is subjected to vacuum and the excess butyl alcohol is distilled off. In the present instance the excess butyl alcohol is approximately 20 parts. Thereafter the paramethoxyphenol and hydroxyethyl acrylate are added to the reaction flask and heated for two hours under reflux at 140°C to produce a material having the formula:

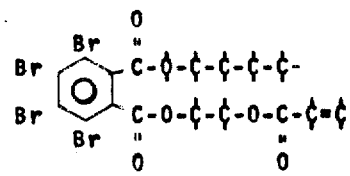

A thermoplastic polymer embodying the present invention is prepared with the above material using the following materials:

| | |
|---|---|
| Reaction product above described | 20.5 parts |
| Styrene | 200 parts |
| Glacial acrylic acid | 3 parts |

The thermoplastic is prepared by charging the above ingredients to a reactor that is connected to a reflux condenser which is vented to atmosphere. The reactor is purged and heated to 158°F over a period of 1 hour. Thereafter 5.0 parts of styrene, and 0.23 parts of Vazo 64 (Aso-bis-isobutro-nitrile) catalyst is added to the reactor which is then pressurized with nitrogen to 4 or 5 pounds per square inch gauge. Vazo is a trademark of the DuPont Company. The mixture is heated for 5 minutes and thereafter 10 parts of styrene and 0.22 parts of Vazo 64 are added at the rate of 2.5 parts per hour. The reaction is continued until the product achieves a solids content of 39.5%. Tetrahydroquinone inhibitor is added in an amount of 0.22 gram per pound of the dilution styrene, and the reactor is then cooled to 90° to 100°F and the product is diluted with styrene to a solids content of 33.3%. The mixture is agitated for one hour to thoroughly disperse the inhibitor and stop further reaction.

A matrix resin mix is made from the following ingredients:

| Ingredients | Parts by Weight |
| --- | --- |
| Unsaturated polyester resin (1 mole phthalic anhydride, 1 mole maleic anhydride, 2 moles propylene glycol cooked to an acid number of 30 to 35 and diluted with styrene to 67% solids) | 1200 |
| Thermoplastic polymer produced as above described dissolved in styrene | 800 |
| Tertiary Butyl Perbenzoate | 13.2 |
| Benzoyl Peroxide | 6.0 |
| Zinc Stearate | 80.0 |

The resin mix is produced by charging the polyester resin to a Cowles mixer, and thereafter slowly adding the other ingredients while the mixer is running to thoroughly disperse the ingredients throughout the resin.

A Molding Premix is made from the following ingredients:

| Ingredients | Parts by Weight |
| --- | --- |
| Above resin mix | 1763.0 |
| Calcium carbonate filler (325 mesh) | 315.0 |
| Clay filler | 2832.0 |
| One quarter inch chopped glass fibers produced according to Example 1 of Ward U.S. Patent No. 3,702,276 | 1080.0 |

The Molding Premix is made by adding the resin mix to a Baker-Perkins single blade type mixer, followed by the clay and calcium carbonate filler while the mixer is running. After the above ingredients are dispersed into the resin, the mixer is run for an additional 2 minutes to assure a uniform dispersion. Thereafter the ¼ inch chopped glass fibers are blended in, and the mixer is run for an additional 1 minute period to assure a uniform dispersion of the strand throughout the other ingredients. The Molding Premix produced as above described has approximately 18% glass by weight.

A test specimen is made by weighing out a sufficient amount of the premix to fill a flat bottom mold to a depth of 0.100 inch and bringing a cover die down upon the resin with sufficient force to provide a loading of 2,000 pounds per square inch on the resin. The premix is cured under this compression for 3 minutes at a temperature of 280° to 300°F, following which the molded sheet is removed and cooled. A test specimen approximately ½ inch wide and 2½ inch long is cut from the material and the test specimen is notched, all in accordance with the procedure set forth in ASTM test specification D-256. The test specimen is placed on an Izod impact strength testing machine, and the weighted pendulum is allowed to strike the cantilevered end of the specimen. The test specimen has an impact strength of between 6.0 and 8.0 foot pounds per inch of width.

Another control test specimen was cut out from the molded sheet, and was tested according to ASTM specification D-229 for its flame retardant properties. The test results are given in the following Table along with the tests of a control material made from a premix, not according to the principles of the present invention, and having the following ingredients:

| Ingredients | Parts by Weight |
| --- | --- |
| Unsaturated polyester resin as given above | 1200 |
| Polystyrene having a molecular weight of 150,000, 33% solids in styrene | 722 |
| Brominated fire retardant— *Fyrol (Bis beta-chloroethyl vinyl phosphate) | 78 |
| Calcium carbonate filler (325 mesh) | 315 |
| Clay filler | 2832 |
| One quarter inch chopped glass fibers as used above | 1080.0 |

*Fyrol is a trademark of the Stauffer Chemical Company.

Test specimens of this material were prepared in the same manner given above and were used as the control in Table 1.

TABLE 1

| Materials | **Ignition Time | **Flame Out |
| --- | --- | --- |
| Control test specimen | 101 sec. | 74 sec. |
| Test specimen prepared as above described and according to the present invention | 101 sec. | 61 sec. |

**Using Federal Test Method Standard No. 406.

EXAMPLE 2

The process of Example 1 was repeated excepting that the halogenated anhydride monomer used to prepare the thermoplastic resin was tetrachlorophthalic anhydride instead of the tetrabromophthalic anhydride. The test specimen prepared using the tetrachloro material had substantially the same fire retardancy as that of the test specimen produced according to Example 1.

EXAMPLE 3

A thermoplastic polymer according to the present invention was made by using the tetrabromophthalic heteroester produced according to the procedure given in Example 1. 20.5 parts of this monomer, and 20 parts of acrylonitrile are added to a pressure reactor along with 180 parts of a styrene solvent and 3 parts of acrylic acid. The material is cooked at 158°F temperature for 4–8 hours to give a terpolymer having a molecular weight of 150,000–190,000 dissolved in the styrene. Additional styrene is added to give a solids content of 33% in the styrene. This material is used according to the procedure of Example 1 to make a molding compound which when tested has substantially the same properties as does the materials of Example 1.

EXAMPLE 4

The procedure of Example 3 is repeated excepting that methylmethacrylate is substituted for the acrylonitrile, and the product produced has substantially the same fire retardant properties as does the material of Example 1.

EXAMPLE 5

The process of Example 1 is repeated excepting that dibromosuccinic acid anhydride is substituted for the tetrabromophthalic anhydride. The material produced has substantially the same fire retardant properties as does the material of Example 1.

EXAMPLE 6

The process of Example 1 is repeated excepting that dibromohexhydro-phthalic acid anhydride is substituted for the tetrabromophthalic anhydride. The material produced has substantially the same fire retardant properties as does the material of Example 1.

EXAMPLE 7

The process of Example 1 is repeated excepting that the following unsaturated polyester is used for the thermosetting prepolymer:
 (1.05 mole propylene glycol, 1 mole maleic anhydride, cooked to an acid number of 52 and diluted with styrene to 63% solids)

Test specimens produced with this material using the procedure of Example 1 have generally the same properties as does the specimens of Example 1.

EXAMPLE 8

The process of Example 1 is repeated excepting that the following unsaturated polyester is used for the thermosetting prepolymer:
 (2.1 moles propylene glycol, 1.0 mole phthalic anhydride, 1.0 mole maleic anhydride, cooked to an acid number of 48 and diluted with styrene to 65% solids)

Test specimens produced with this material using the procedure of Example 1 have generally the same properties as does the specimens of Example 1.

EXAMPLE 9

The process of Example 1 is repeated excepting that cetyl alcohol is substituted for the butyl alcohol in producing the half ester of the thermoplastic brominated monomer. The cured molding compound so produced has substantially the same fire retardant properties as does the material of Example 1.

EXAMPLE 10

The process of Example 1 is repeated excepting that allyl alcohol is substituted for the hydroxyethyl acrylate of Example 1. The cured molding compound produced has substantially the same fire retardant properties as does the material of Example 1.

EXAMPLE 11

The process of Example 1 is repeated excepting that crotyl alcohol ($CH_3CH=CH\ CH_2OH$) is substituted for the hydroxyethyl acrylate of Example 1. The material produced has substantially the same fire retardant properties as does the cured molding compound of Example 1.

EXAMPLE 12

The process of Example 11 is repeated excepting that cinnamyl alcohol ($C_6H_5CH=CH\ CH_2OH$) was used in place of the crotyl alcohol. The cured molding compound so produced has substantially the same fire retardant properties as does the material of Example 1.

EXAMPLE 13

The process of Example 1 is repeated excepting that hydroxypropyl acrylate is substituted for the hydroxyethyl acrylate of Example 1. The material produced has substantially the same fire retardant properties as does the cured molding compound of Example 1.

EXAMPLE 14

The process of Example 11 is repeated excepting that hydroxypropyl methacrylate was used in place of the crotyl alcohol. The cured molding compound so produced has substantially the same fire retardant properties as does the material of Example 1.

EXAMPLE 15

The process of Example 1 is repeated excepting that the tetrabromophthalic anhydride-styrene-acrylic acid terpolymer was used in an amount of 5% relative to its combined weight with the polyester resin. This material has fire retardant properties as follows:

| Ignition Time | Flame Out |
|---|---|
| 95 sec. | 85 sec. |

By way of comparison, sheet molding compounds that did not include the tetrabromophthalic anhydride-styrene-acrylic acid material but comprised an equal percentage of styrene-acrylic acid copolymer had the following fire retardant properties:

| Ignition Time | Flame out |
|---|---|
| 90 sec. | 103 sec. |

EXAMPLE 16

The process of Example 15 is repeated excepting that the tetrabromophthalic anhydride-styrene-acrylic acid terpolymer is used in a ratio of 50-50 relative to the thermosetting resin of Example 1. This material had the following fire retardant properties:

| Ignition Time | Flame Out |
|---|---|
| 135 sec. | 38 sec. |

It will now be seen that the thermoplastic materials of the present invention will produce their synergistic effect with any type of thermosetting prepolymer that is dissolved in a common solvent with the thermoplastic material, and that the thermoplastic has particular advantages when mixed with polyester and/or polyurethane prepolymers. The mixture of thermosetting prepolymer, thermoplastic resin, and common solvent can be used in either bulk molding compounds where the mixture is gelled by an alkaline earth oxide to form a dough that is put into heated presses and cured; or the mixture can be used in sheet molding compounds wherein the resin mixture is mixed with glass fibers and alkaline earth oxides and formed into sheets between layers of plastic and in which condition the material is gelled. After gelling, the sheet molding compound is fed between heated matched metal dies in a manner not unlike that used in metal stamping operations. Materials of the present invention can be formed into sheet molding compounds by the process taught in the above identified Ward patent.

Broadly speaking the thermoplastic producing halogenated monomer of the present invention is a diester, one ester portion of which is saturated, and the other ester portion of which contains an alkene radical, with the center portion of the molecule being halogenated. The center portion of the molecule which joins the two ester groups can be cyclic or acyclic, saturated or aromatic so long as this portion contains halogen. Preferred materials, will contain bromine, and the most preferred materials are brominated cyclic divalent radicals. Broadly, the thermoplastic producing monomer used in preparing the thermoplastic of the present invention can be represented by the following formula:

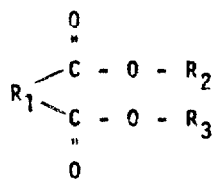

wherein: $R_1$ is a halogenated divalent organo radical devoid of ethylenic unsaturation, $R_2$ is a saturated monovalent organo radical or substituted organo radical, and $R_3$ is an alkene radical or substituted alkene radical.

A divalent benzene ring is the most preferred $R_1$ group since it is believed that this portion contributes to the excellent dye receptivity of the thermoplastic material, and does much to offset any disadvantages of the halogen constituent of the molecule. The two ester groups of the material not only contribute compatibility with urethanes and polyesters by hydrogen bonding therewith, but also produces weak secondary bonds with respect to the alkaline earth oxides that are used as gelling agents in such materials. The $R_2$ radicals can be any organo group that is saturated in order that it will not crosslink with the thermosetting materials. The $R_3$ radical can be any monovalent organo group that contains an alkene or olefinic double bond for the formation of a long chain thermoplastic polymer. Preferred reactants for donating the $R_2$ radical will be alcohols and materials containing a halogen on a carbon atom. Preferred alcohols for donating the $R_2$ group will be alcohols ranging in molecular weight from ethyl alcohol to stearyl alcohol. In such case, the $R_2$ radical will be a $C_nH_{2n-1}$ radical, wherein $n$ is from 2 to 18. Suitable $R_3$ radicals can be contributed by unsaturated halides or alcohols such as allyl alcohol, crotyl alcohol, cinnamyl alcohol, oleyl alcohol, etc., or can be contributed by esters which contain an OH group and an alkene group. Common ester reactants that can be used will be the hydroxy alkyl acrylate esters and substituted acrylate esters, as for example, halogen substituted hydroxy alkyl acrylate esters and substituted acrylate esters, particularly the bromine substituted esters. Examples of halide reactants which can be used are allyl chloride, allyl bromide, allyl iodide, beta-methyl vinyl bromide, etc. Other ester radicals may comprise unsaturated fatty acid ester groups, wherein the other precursor contained two halogen and/or OH groups.

The thermoplastic polymers of the present invention may be homopolymers but are preferably copolymers or terpolymers that are produced by reacting from 0.5 to 5% of an unsaturated acid containing material, from 5 to 95% of the above referred to diester monomer, and from 0 to 94.5% of a nonhalogen, nonphosphorus containing monomer or mixture of monomers containing unsaturated groups, such as vinyl, allyl, or acrylic groups, and a preferred monomer of which is styrene.

The thermoplastic-thermosetting resin mixture will comprise the above referred to thermoplastic along with any unsaturated thermosetting material and an unsaturated mutual solvent therefore. Such a mixture will comprise the following in approximate percentages by weight:

| Ingredients | Percent by Weight |
|---|---|
| Thermosetting prepolymer | 50 to 95% |
| Thermoplastic polymer of the present invention | 5 to 50% |
| Unsaturated solvent | 0 to 45% |

Molding compounds of the present invention may comprise the following materials in approximate percentages by weight:

| Ingredients | Percent by Weight |
|---|---|
| Glass fiber reinforcement—preferably chopped | 5 to 40% |
| Alkaline earth oxide gelling agent | 0.10 to 10% |
| Catalyst | 0.05 to 5.0% |
| Fillers | 10 to 50% |
| Resin mixture above described | 40 to 95% |

The catalysts used may be any free radical catalyst as will be understood by those skilled in the art, and suitable examples of which are: dicumylperoxide, benzoylperoxide, paramethoxyphenol, paratoluenes, sulphonic acid, azobisisobutronitrile, etc.

Any type of suitable fillers can be used e.g. $CaCO_3$, silica, carbon black, etc. The alkaline earth oxide gelling agent may be MgO, $Ca(OH)_2$, $Mg(OH)_2$, etc. as is disclosed in the literature including the patent or patents above referred to.

It will now be seen that the basic structure of the thermoplastic polymer is very similar to that of the thermosetting resin prepolymer in which it is intended to be incorporated. This similarity of the molecules makes the materials more compatible than are the thermoplastic and thermosetting materials which have been used together heretofore. The thermoplastic polymers separate out of polyester resin prepolymers as optimumly sized uniformly spaced particles during cure of the thermosetting polyester prepolymers. The optimum particle size avoids the opacity of prior art smaller particles which refract the light and produce the opacity. Benzene rings appear to provide good pigmentability, and because the preferred thermoplastic materials include benzene rings, as does the thermosetting prepolymer, the composite material has a more uniform pigmentation than has been achieved heretofore by prior art mixtures of fire retardant thermoplastics and thermosetting resins.

While the invention has been described in considerable detail, we do not wish to be limited to the particu-

We claim:
1. A thermosetting molding compound comprising the following materials in approximate percentages by weight:

| | |
|---|---|
| Glass fiber reinforcement | 5–40% |
| Alkaline earth oxide gelling agent | 0.01–10% |
| Polymerization catalyst | 0.05–5% |
| Fillers | 10–50% |
| Resin matrix forming material | 40–95% | wherein said resin matrix forming material comprises the following mixture in percent by weight:

| | |
|---|---|
| Thermosetting resin polymer | 60–90% |
| Thermoplastic resin polymer | 5–50% |
| Unsaturated solvent for said polymer and prepolymer | 0–45% | and wherein said thermoplastic polymer is a heteropolymer of a mixture of alkene radical containing monomers which include from approximately 5% by weight to approximately 95% by weight of a material having the formula:

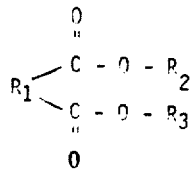

wherein: $R_1$ is a chlorinated or brominated divalent organo radical devoid of ethylenic unsaturation, $R_2$ is a saturated monovalent organo radical or substituted organo radical, and $R_3$ is an alkene radical or substituted alkene radical.

2. The molding compound of claim 1 wherein $R_1$ is a chlorinated or brominated divalent benzene ring.

3. The molding compound of claim 1 wherein $R_1$ is a brominated divalent benzene ring.

4. The molding compound of claim 1 wherein $R_3$ is an acrylic or substituted acrylic radical.

5. The molding compound of claim 1 wherein $R_3$ is an allyl or substituted allyl radical.

6. The molding compound of claim 1 wherein said thermosetting resin prepolymer is a polyester prepolymer and said thermoplastic resin is a polystyrene heteropolymer.

7. The molding compound of claim 1 wherein $R_1$ is a chlorinated or brominated divalent benzene radical, and $R_3$ is an acrylic or substituted acrylic radical.

8. The molding compound of claim 1 wherein said thermosetting prepolymer is a polyester prepolymer, and said solvent is styrene.

9. The molding compound of claim 1 wherein said thermoplastic heteropolymer is the reaction product of the following materials: from 5% to 95% by weight of:

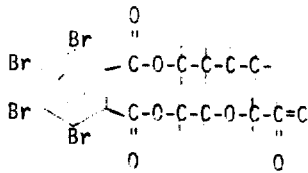

from 0.5% to 5% by weight of an organo acid, and from 0% to 94.5% by weight of styrene.

10. A molding compound comprising:
a. 20 to 90 weight percent of a polyester prepolymer;
b. 2.5 to 47.5 weight percent of a thermoplastic heterpolymer comprising the reaction product of from 5% to 95% by weight of a material having the formula

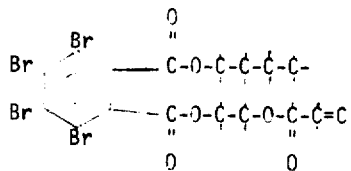

from 0.5% to 5% by weight of an organo acid and from 55% to 94.5% by weight of styrene;
c. up to 43% weight percent styrene;
d. about 5 to about 40 weight percent glass fibers;
e. about 0.05 to about 5.0% of a free radical catalyst and,
f. about 0.1 to about 10% of an alkaline earth metal oxide.

* * * * *